United States Patent [19]
Allison et al.

[11] Patent Number: 6,052,450
[45] Date of Patent: Apr. 18, 2000

[54] BILLING FOR COMMUNICATIONS USAGE

[75] Inventors: David Stephen Allison, Walnut Creek, Calif.; David Martin Hawthorne, Belfast, United Kingdom; Andrew Mairs, Down, United Kingdom; William George Glass, South Glamorgan, United Kingdom

[73] Assignee: British Telecommunications public limited company, London, United Kingdom

[21] Appl. No.: 09/000,271
[22] PCT Filed: Jul. 29, 1996
[86] PCT No.: PCT/GB96/01836
§ 371 Date: Jan. 27, 1998
§ 102(e) Date: Jan. 27, 1998
[87] PCT Pub. No.: WO97/05734
PCT Pub. Date: Feb. 13, 1997

[30] Foreign Application Priority Data

Jul. 27, 1995 [EP] European Pat. Off. .............. 95305312

[51] Int. Cl.[7] .................................................. H04R 15/00
[52] U.S. Cl. ........................................... 379/127; 379/112
[58] Field of Search ..................................... 379/112, 114, 379/115, 119, 117, 121, 127; 455/406, 407, 408

[56] References Cited

U.S. PATENT DOCUMENTS 5,027,388  6/1991  Bradshaw et al. ...................... 379/112
5,659,601  8/1997  Cheslog .................................. 455/406

FOREIGN PATENT DOCUMENTS 0 358 408  3/1990  European Pat. Off. .
WO A 83 97661  4/1983  WIPO .

OTHER PUBLICATIONS

NOMS 90. IEEE 1990 Network Operations & Management Symposium, Feb. 11, 1990–1914, San Diego, CA US., p. 1–10 XP000534180 R.L.Aveyard et al.: "New Billing System Development" see p. 9–p. 10.

Tencon '89 Nov. 22–24, 1989, Bombay, India, pp. 593–599, XP000203943 I. Benyacar et al.: "Concepts in recording of services" see the whole document.

*Primary Examiner*—Paul Loomis
*Attorney, Agent, or Firm*—Nixon & Vanderhye P.C.

[57] ABSTRACT

A method and apparatus produce a bill for usage of a telecommunications network. The system obtains from the telecommunications network a set of events on the network; provides a set of schema applicable to a set of products available to the user, the schema for processing events retrieved from the network, selects from the set of schemas, schemas applicable to the products used by the user; and applies the selected schemas to the set of events to process the events into a form ready for bill production.

19 Claims, 8 Drawing Sheets

BILLING FOR COMMUNICATIONS USAGE

BACKGROUND OF THE INVENTION

1. Field of the Invention

This invention relates to billing for communications usage. In particular it relates to a billing system responsive to usage events in a communications network to process event data to support invoice production.

2. Related Art

In communications networks such as public switched telecommunications networks (PSTN), the customer receives charges based on usage of the network. Hence a billing system needs to detect usage of the network and to process data in respect of that usage so as to output a bill or other charging mechanism.

For instance, when telephone calls are established across the British PSTN, records are created at the exchanges recording details about the call. The details will include information such as duration of the call, time of day of the call, start and end, the originating telephone line and destination telephone line. This information is periodically accessed by billing systems and processed into invoices which are sent out to the customer.

A problem with present billing systems is that they can be very inflexible. For instance, when a communications service provider wishes to update its charges or wishes to introduce new services over the PSTN, a protracted and difficult upgrading process can be required to enable the billing system to cater for the new charging regime.

SUMMARY OF THE INVENTION

According to a first aspect of the invention there is provided a method of processing data for producing a bill for usage of a communications network, the method comprising:

i) receiving event data from the communications network, the event data concerning network usage by a user;

ii) providing a set of schemas applicable to communications services available to users by means of the network, at least one schema containing service specific data and at least one rule, or an identifier for at least one rule, for use in processing received event data in respect of that service;

iii) selecting from the set of schemas one or more schemas applicable to the event data received; and iv) applying the selected schema(s) to the event data to process the event data for bill production.

Preferably, the method further comprises:

v) storing a generic data processing structure, comprising an ordered set of data processing nodes which are ordered for the processing of event data relating to communications services available over the network, each node having an associated schema from the set of schemas; and vi) storing user specific information which identifies a set of services selected from the communications services available over the network and allocated to that user wherein the step of selecting one or more schemas is carried out by selecting a subset of the data processing nodes which have associated therewith schemas for processing network event data in respect of the selected set of services.

The schemas may be stored in the nodes of the generic data processing structure but it may be more convenient that they are stored in a separate data structure, the generic data processing structure containing identifiers for the schemas rather than the schemas themselves.

Although the term "user" is used above, the user may in fact be one of many representatives of a customer. For instance, a customer may be a multi-national company. In this case, it will be understood that the "user specific information" can in fact be relevant to all users of one particular customer.

Embodiments of the present invention have the advantage that they can be relatively easily modified, for instance to cater for changes in a charging regime. Firstly, the services available over the network may change. In that case, the set of schemas or the generic data processing structure can be updated. Alternatively, a customer may choose to add or delete a service from their specific set of services, or to change the specification for a particular service. In that case, the customer specific information can be updated.

According to a second aspect of the invention there is provided apparatus for processing data for producing a bill for usage of a communications network, the apparatus comprising:

means for receiving from the communications network a set of event data attributable to usage of the network;

means for storing an ordered set of schemas applicable to a set of products available to a user, each schema comprising a logical process or an identifier for a logical process for processing event data received obtained from the network;

means to select from the set of schemas those applicable to a selected set of communications products or services available to the user; and means to apply the selected schemas to the event data received from the network to process the events into a form ready for bill production.

BRIEF DESCRIPTION OF THE DRAWINGS

A specific embodiment of the invention will now be described, by way of example only, with reference to the drawing in which.

DETAILED DESCRIPTION OF EXEMPLARY EMBODIMENTS

Figure 1:
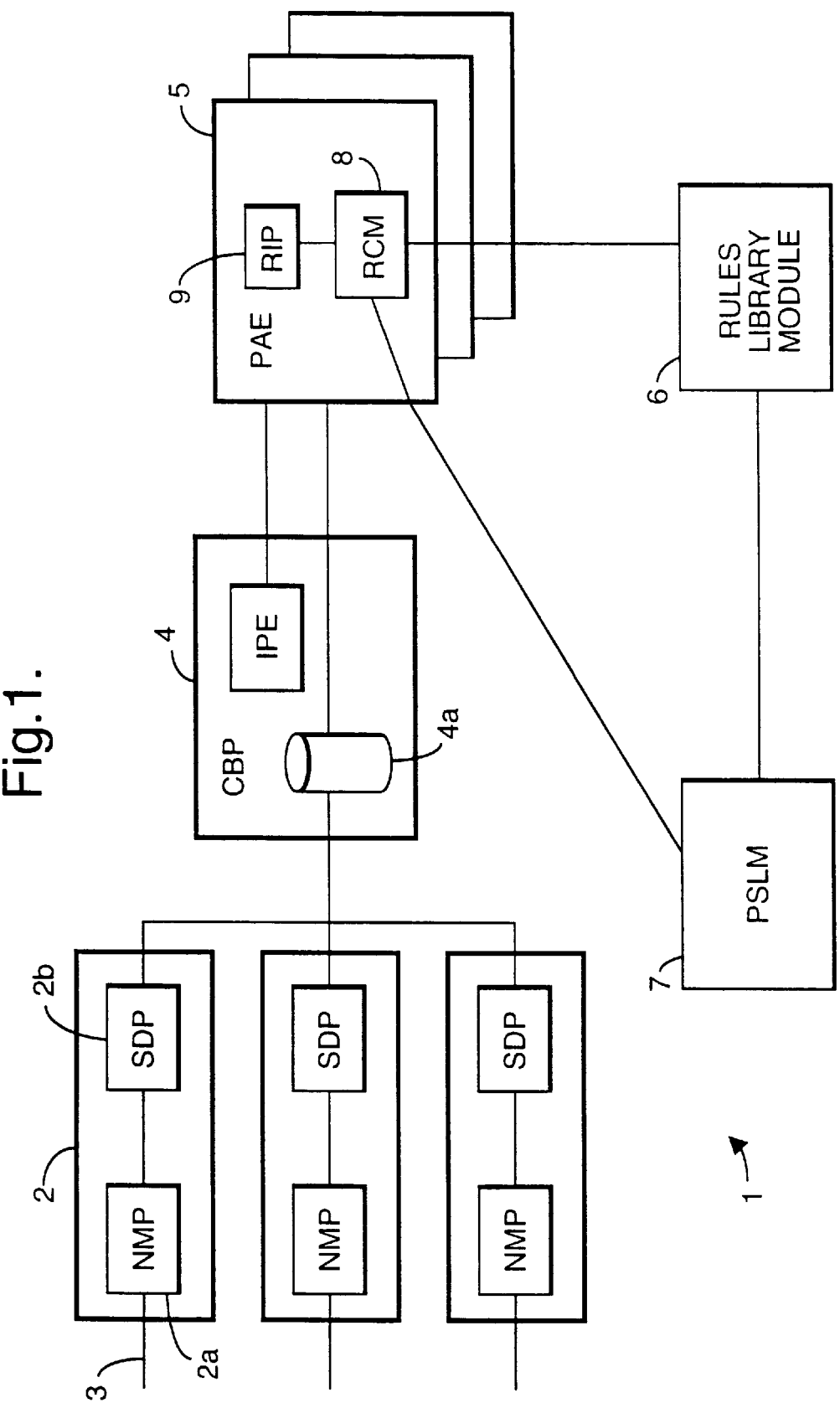
FIG. 1 shows in schematic block diagram form a billing system in accordance with the invention.

The following is a glossary of acronyms used in this specification, as an aid in reading the specification:
PDG: Primary Data Generator (such as a network exchange)
NMP: Network Mediation Processor
PIUR: Platform Independent Usage Record
SDP: Service Domain Processor
PSLM: Products and Services Life-Cycle Manager
MEL: Master Event List
PEL: Processed Event List
CBP: Customer Billing Processor
IPE: Invoice Production Engine
PAE: Pricing and Assembly Engine module
CDM: Customer Data Module
CFM: Common Functions Module
ECM: Environmental Control Module
ELM: Event List Module
GMM: Graph Manipulation Module
PDM: PSLM Data Module
RIP: Rules Interpretation Processor
RCM: Rules Compiler Module
SMM: Shared Memory Module With reference to FIG. 1, a billing system 1 for generating bills for usage of a telecommunications network comprises a number of modules of software which provide the system with functionality. The system can be implemented on any suitable computing platform but will generally be distributed over a number of computer systems networked to enable appropriate interaction.

In more detail, the system 1 includes a number of interfaces 2 to the network, three of which are shown although more than this will usually be provided for use with a network such as a PSTN. Each of the interfaces 2 is connected to a respective plurality of exchanges in the telecommunications network by links 3. The interfaces 2 are in turn connected to a customer billing processor CBP 4.

A number of pricing and assembly engine modules (PAE) 5, three of which are shown, are arranged to interact with the CBP 4. These are also arranged to interact with a rules library module 6 and a products and service life cycle manager (PSLM) 7.

From the figure, it will be seen that the PSLM 7 is also arranged to interact with the rules library module 6.

The interfaces 2 periodically poll the exchanges to which they are connected for information about network usage. The information is then processed into a form which is suitable for storage by the CBP 4. The CBP 4 stores the information in a database 4a.

The modules of the system 1 will now be described in more detail.

Each interface 2 comprises two processors, a network mediation processor (NMP) 2a and a service domain processor (SDP) 2b.

The NMP 2a is a processor for collecting event-related data from elements in the telecommunications network. These elements can be called primary data generators (PDGs) for the purpose of embodiments of the present invention. In a telecommunications network of the type generally in use today, they usually comprise exchanges. In this embodiment the NMP 2a runs on a UNIX platform on an ICL DRS 6000 workstation. The NMP 2a interfaces to and collects usage records from the primary data generators.

The usage records contain data for billable events and may for instance be records of the origin, destination, time of commencement and duration of telephone calls routed by an exchange of the network.

In order to obtain the data, the NMP 2a polls a list of the exchanges it serves.

The usage records will vary in format according to the type and manufacturer of the data generator and part of the processor's task is to standardise and consolidate the records. The consolidated records are called platform independent usage records (PIURs) and these are output to the SDP 2b by encoding the records according to ASN1, an Open Systems Interconnection protocol.

The SDP 2b receives the PIURs from the NMP 2a and applies a set of undiscounted, simple tariffs to them in order to produce call records priced according to transaction based, elapsed time pricing. These priced call records are passed to the CBP 4.

The CBP 4 takes the priced call records files generated by the SDPs 2a and assembles the information into a single data file. This file is stored on the database 4a for subsequent processing by a PAE 5.

The CBP 4 contains a bill schedule process which runs against a customer billing database to determine which customers are to be billed. It does this by examining bill due dates and any other special flags which indicate that a bill is required, such as a "bill now" flag or "threshold breached" flag. This triggers selection of an available PAE 5 to which customer specific data is then sent for processing.

Because billing is done periodically, all the information for a bill period can be assembled and it is possible to take into account many aspects of usage, including of course discounting against usage. It is also possible to take account of customer specific information such as pricing across multiple accounts.

Each PAE 5 is essentially an event processor. An "event" for the purposes of the PAE 5 is the establishing of a connection on the network which is to be billed. For example, an event could be a call on the PSTN, a private circuit rental event or a transfer charge event. The file assembled from the priced call records files and received by the PAE 5 from the CBP 4 is converted in the PAE 5 into a master event list MEL. Each event on the MEL is a PIUR.

The output of the CBP 4 to the PAE 5 is sorted by "service" and, within each "service", in chronological order of distinguishing date/time. Each event may have a single date/time associated with it, in which case this is the distinguishing date/time. Alternatively there may be multiple date/times, such as start and finish date/times, or a start date time and a duration. In these cases, it is the start date/time which is the distinguishing date/time. The PAE 5 needs chronological date/time information for several reasons, such as where there has been start/stop/resume of a service in the period covered by a bill. It is simpler if the CBP 4 provides an event list in chronological order so that the PAE 5 does not have to support sorting. However, this does mean that events have to be have been provided with a common time zone.

The PAE 5 processes events of the MEL either singly or in groups creating a processed event list (PEL). Each PEL is a subset of the events on the MEL together with information on how the events have been processed in the PAE. Thus the PEL has a processing audit which should an error occur in the billing process allow the origin of the error to be determined and corrective action to be carried out to prevent that fault from reoccurring.

The PAE 5 processes events for a customer according to a set of related schemas for that customer. A schema is a logical process (not a UNIX process) that executes a rule provided by the PSLM 7 to produce for instance a price for a product or information for a bill. The PSLM 7 supplies rules (in plain text) which have been identified by a set of schemas concerned with the processing of the telecommunications usage. These rules can cater for the pricing of a wide range of services such as cost of time units, rental, and call services. Obviously, these prices may change over a time period for which a bill is to be produced and this is dealt with by reference to the distinguishing date/time for each event, mentioned above, and the application of the schemas. The schemas are held as a generic graph in a way which will be explained later. A set of related schemas for a customer is generated by applying customer specific data to the generic graph.

This also is further dealt with below.

The rules for the schemas are held in the rules library module 6.

The PAE 5 includes a rule compiler module (RCM) 8. This module receives rules in plain text format from the PSLM 7 and converts them to a form of pseudo machine code (p-code) which represents the machine instructions for a virtual stack based machine. The PAE 5 also has a rules interpretation processor (RIP) 9 which understands the p-code form of the rules. The interpreter 9 runs as a separate process for scalability as several interpreters can run at the same time.

Figure 2:
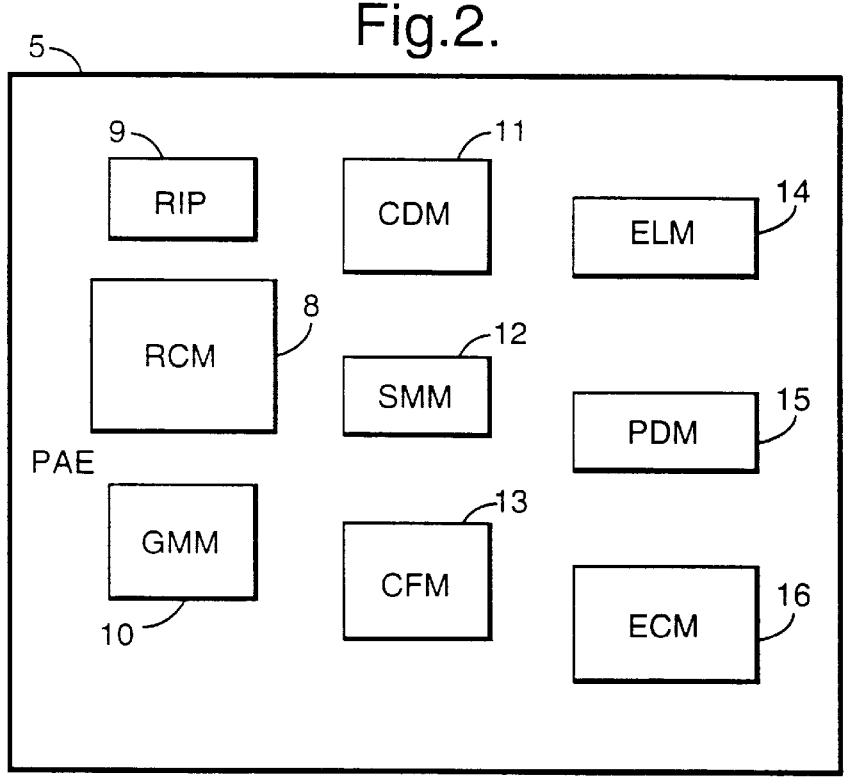
FIG. 2 shows in schematic block diagram form a pricing and assembly engine which is a component of the system shown in FIG. 1.

The PAE will now be described in greater detail with reference to FIG. 2. The PAE 5 includes a number of modules. Modules are collections of software code which provides functionality to the PAE and are thus functional components and not architectural components. The first two modules were mentioned earlier and these are the RIP 9 and the RCM 8. A third module is a graph manipulation module (GMM) 10. A fourth module is a customer data module (CDM) 11. A fifth module is a shared memory module (SMM) 12. A sixth module is a common functions module (CFM) 13. A seventh module is an event list module (ELM) 14. An eighth module is a PSLM data module (PDM) 15. A ninth module is an environmental control module (ECM) 16.

The functionality provided by each of the modules will now be described.

The GMM 10 is a core module of the PAE 4 for it provides a function of building and manipulating graphs of pricing and billing schemas on a cellular framework (the concept of graphs will be described later). This module connects schema together to build a schema graph, tests the resulting graph to ensure that it is acyclic that is to say that there are no endless loops, instantiates a graph for a particular instance of a customer and invokes execution of that graph. These processes will be described in greater detail later.

The CDM 11 provides the functionality required for handling customer data in the PAE 5. The customer data can be both inventory data and event data. It receives incoming files from the CBP 4 and parses them into separate files for each customer. It then parses each separate customer specific file and puts the inventory data into shared memory. The event data is formed into a master event list MEL and passed to the ELM 14 which then puts the MEL into shared memory controlled by the SMM 12. This module also enables the inventory data in shared memory to be accessed and combines invoice ready files (files processed by the PAE) and sends them back to the CBP 4, in particular to an invoice production engine (IPE) 4b which prints off the bill.

The SMM 12 provides functions to manage memory allocation within memory which is shared by the modules.

The CFM 13 provides a set of general purpose functions or utilities for use by other modules when required. The utilities include file access, rounding and error logging utilities.

The ELM 14 provides the functionality required for manipulation of events. It enables creation of a MEL from event data received from the CBP 4, provides access to the original event data received from the CBP 4, creates PELs and adds pricing and assembly information to PELs. It also enables the selection and manipulation of event lists within PELs and builds the invoice ready data files which are sent back to the CBP 4.

Figure 3:
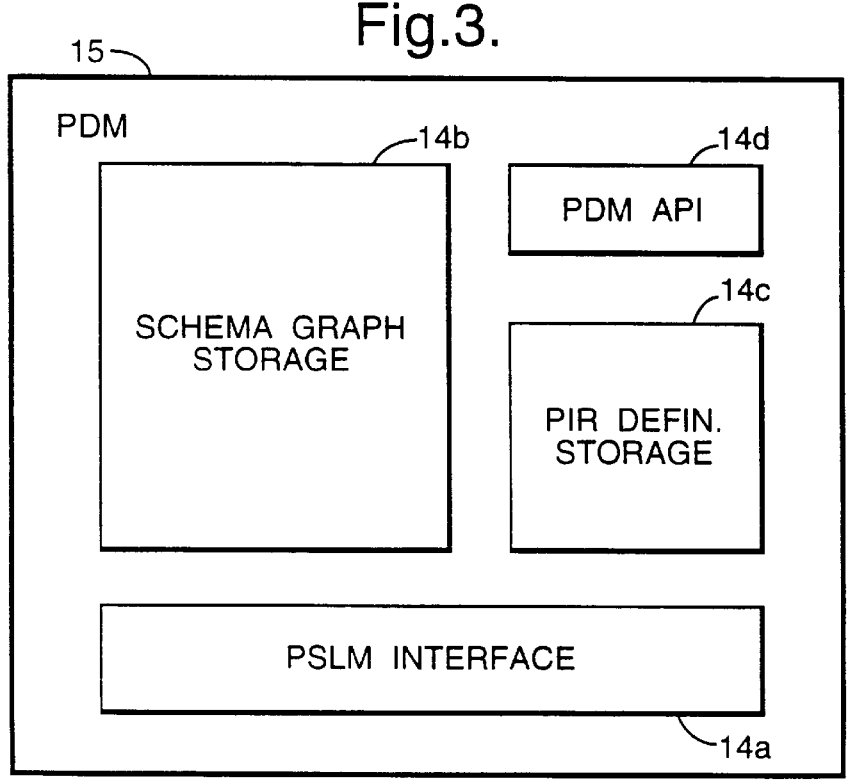
FIG. 3 shows in schematic block diagram form a module of the engine shown in FIG. 2.

The PDM 15 comprises a number of sub-modules as shown in FIG. 3. The sub-modules include a PSLM interface 15a, a schema graph storage module 15b, a platform independent record definition storage 15c and a PDM API 15d which enables access to the PIRs held in storage 15c by other modules. The schema graph storage module 15b stores the schema rules and information necessary to build the schema graph. It stores the schema rules in an internal form after receiving them from the RCM 8. The RCM 8 converts the rules to the internal form from the form in which they are received from the PSLM 7.

The ECM 16 provides co-ordination for the other modules, controlling the work flow amongst the other processors. In particular it detects when updating is necessary, for instance of the generic graph mentioned above. When an update is necessary, it is the ECM 16 which will stop new processing starting up, waiting until processes already in progress have finished before triggering the necessary updating and restarting processing.

The principle which the PAE 5 follows is that the company's products and services used by the customers can be represented as a graph in which the nodes can process events generated by a customer. Each node in the graph has an associated schema and the interconnection of the node defines the inter-relationship which exists between the schemas. Each node will process a relevant set of customer generated events and the flow of events from a first node to a final node results in a final customer invoice. This concept is illustrated in FIG. 4.

Figure 4:
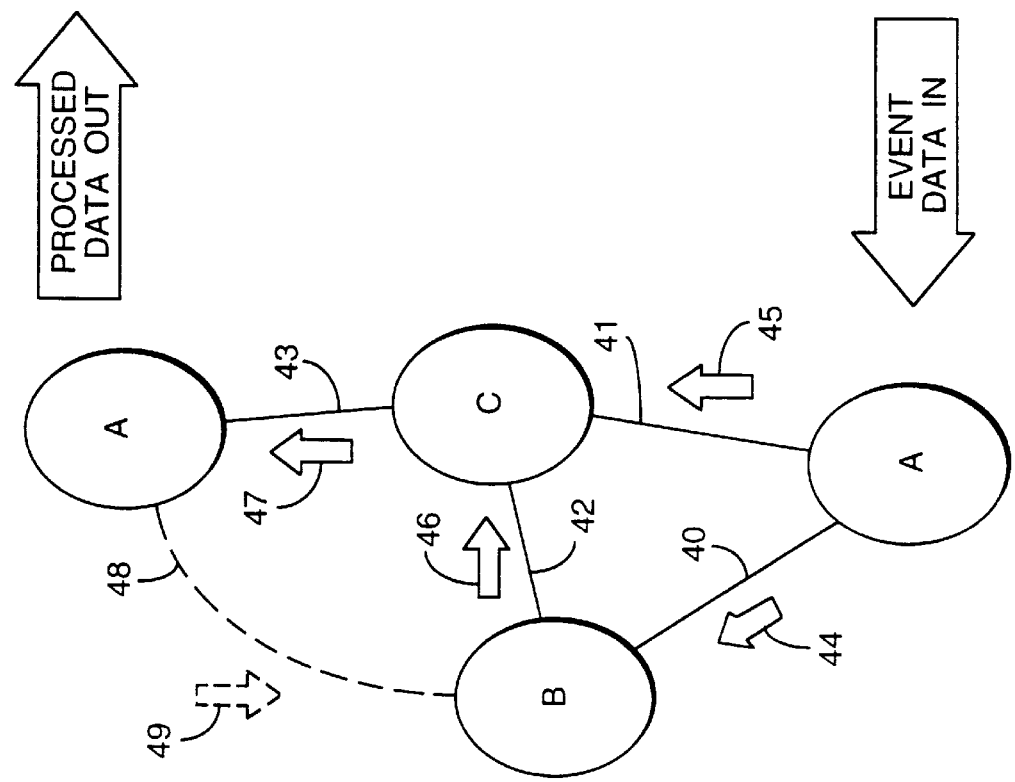
FIG. 4 is an explanatory diagram used in an explanation of the concept of a cellular network of schemas to be applied to data obtained from a telecommunication network in order to produce a bill for usage.

In FIG. 4 the various processes that can be performed on the event data input into the PAE 4 are shown as nodes A, B, C and D. The nodes are interconnected by links 40 to 43. Node A is interconnected by link 40 to node 8 and by link 41 to node C. Node B is interconnected to node C by link 42. Node C is interconnected to node D by link 43.

Data "flows into" the graph at the bottom node as represented in the figure, that is, in this case, node A. Node A performs its operations on the data and passes the results of those operations to node B and node C, as represented by data flow arrows 44 and 45. Node B performs its operations on the data it receives from node A and passes the results of those operations to node C as represented by data flow arrow 46. Node C performs its operations on the data received from node A and node B and passes the results of those operations to node D as represented by dataflow arrow 47. Node D performs its operations and since it is the final node the processed data "flows out of" the graph.

The graph is, in this case, acyclic since there are no endless loops. Consider the same graph with the addition of a link 48 (shown in broken outline) interconnecting node D back to node B. The link 48 passes data back from node D to node B as represented by dataflow arrow 49. This data would then be passed to node C and thence back to node D. Thus an endless processing loop could be established. It is part of the function of the GMM 10 to verify the graph to ensure that no endless processing loops are introduced during construction of the graph.

Figure 5:
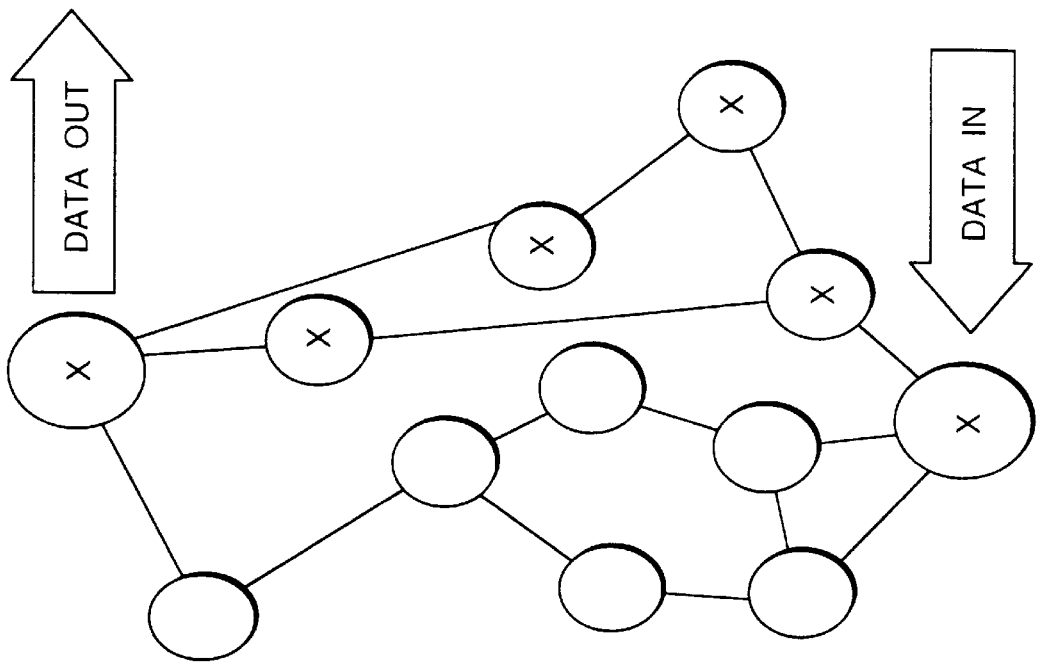
FIG. 5 shows a generic cellular network (graph) and illustrates how cells of the graph may be selected for creating a customer specific graph.

The PSLM 7 holds a generic graph which has processing nodes for every possible service and product offered by the telephone operator. FIG. 5 shows such a generic graph although for the sake of simplicity the number of nodes has been reduced. Not all customers will use all the products and services available. Thus, if this generic graph were to be used directly, a lot of processing steps will be carried out unnecessarily or processing power allocated to the task unnecessarily. This would waste valuable computing time when preparing a bill.

Suppose, for example, a customer utilises those products or services requiring the nodes labelled X then six of the nodes (without labels) will be superfluous.

In order to prevent this the PAE 5 utilises the GMM 10 to tailor the generic graph according to those goods and services the customer has taken.

Figure 6:
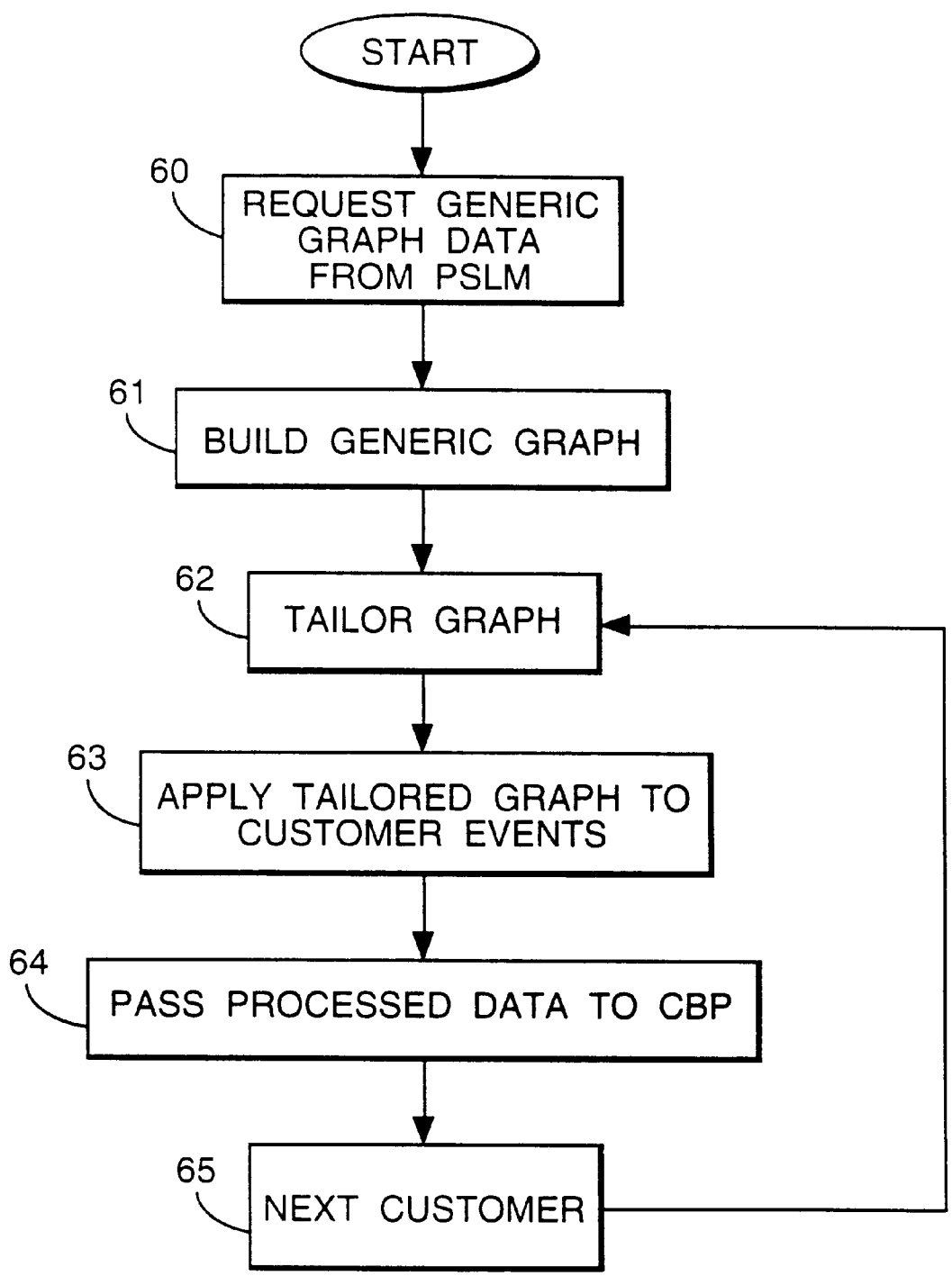
FIG. 6 is an explanatory flow-chart of the operation of the system.

FIG. 6 shows a flow-chart of the operation of the PAE 5. A first stage is for the PAE 5 to request the generic graph data from the PSLM 7 as represented by box 60. This data is used to build a generic graph in a step represented by box 61. The generic graph is tailored to be specific to a customer in a process (to be described later) called "lighting the graph", as represented by box 62. The tailored graph is then applied to the customer events passed to the PAE 5 by the CBP 4, this step being represented by box 63. The PAE 5 passes the processed data back to the CBP 4, as represented by box 64, where it is passed to the IPE 4b and a bill printed out and dispatched to the customer. New customer data is requested from the CBP 4 as represented by box 65 and the steps are then repeated.

The first two step 60 and 61 will now be described in greater detail.

The PSLM 7 holds information on:

1. Products prices and related information which will be used by the PAE 5 to produce a price for a product. For example, the rental charge for a telephone line or the price of an item of equipment such as a telephone or answering machine;
2. The rules for pricing a product or for producing information for a particular billing schema. An example of this would be a discount service such as "Friends and Family" offered by British Telecommunications Plc of 82 Newgate Street, LONDON, United Kingdom. In this service a discount is made on calls to a nominated set of numbers; and
3. The relationships between the various products or bills, including date information.

In essence items 1 and 2 of the information are individual schemas equivalent to the nodes in FIG. 5 and item 3 is equivalent to the links between the nodes. Thus, although the generic graph is not stored in the way depicted in FIG. 5, that is in a pictorial way, all the information required to later form the schema graph is stored.

The schemas are logical processes that execute a rule to produce a price or information to be produced on a bill (for example the total number of telephone units used). The rules implemented in the schema are provided by the PSLM 7 and a schema may be executed more than once in any bill production. In other words a node in the graph of FIG. 5 may be used more than once in processing customer data although not on the same item of data because the graph is acyclic as mentioned above.

Those items of customer information to which a schema may be applied are termed schema instances. This concept is similar to the concept of object class and object instance in object orientated programming. A schema is executed once for each schema instance that exists for that schema. Each time a schema is executed a PEL is created as a record of everything done on the schema instance.

In essence therefore the graph is a "map" of the processes to be carried out on the customer data giving the routes to be followed by the products of those processes to other processes. It should be emphasised that the schema graph is built purely from the data held by the PSLM 7. No customer specific data is held in the nodes and links. It is a generic graph which will cater for a notional customer who will use all of the products and services offered by the operator.

The PSLM 7 sends two types of data to the PAE 5 in order to create the schema graph. The first type concerns the rules—these are sent in a plain text form. The second type is a table mapping each schema to any parent schemas which act upon output generated by that schema.

Figure 7:
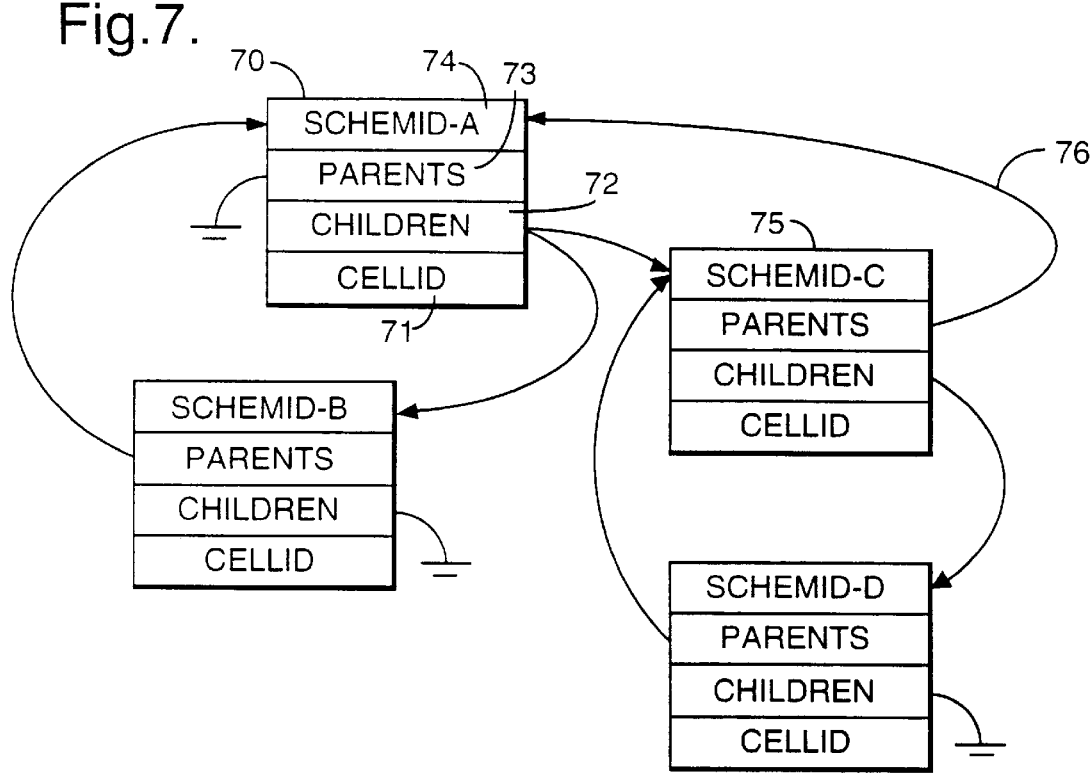
FIG. 7 is an explanatory diagram showing how cells of a graph are provided with datafields including pointers to other cells to establish a cellular network.

The PDM 15 of the PAE 5 translates the table into a form suitable for use with the GMM 10. From this table the GMM 10 builds the generic graph by structuring the data into a node with parents and children, that is, a parent child structure is created. A simplified parent child structure is shown in FIG. 7 and it can be seen that each node is a memory structure including a number of identifiers. Taking node 70, this has a cell identifier field 71, a field 72 including a pointer to children of that node, a field 73 including a pointer to parents of that node and a field 74 identifying the schema. Thus, from the figure, it will be seen that node 75 is schema C, it has a parent schema A as indicated by pointer 76, and it has a child schema which is schema D.

At this stage in the process, a true graph has not been created but just a set of table structures with pointers to other table structures. The next stage is to convert this into cells and synapses of a cellular framework. The conversion process is carried as described in the following pseudo-code after the creation of a root node and a concentrator node.

```
message BUILDGRAPH
{
    copy schema id to cell
    if NO working node children
    {
        connect to concentrator
        enter concentrator child in cell child list
    }
    else
    {
        for each child in working node
        {
            if working node child cellid ==( )
            {
                create cell for child
                connect to child cell
                reset working node to child node
                send BUILDGRAPH to child
            }
            else
            {
                connect to child cell
            }
            enter child in cell child list
        }
    }
}
```

Figure 8:
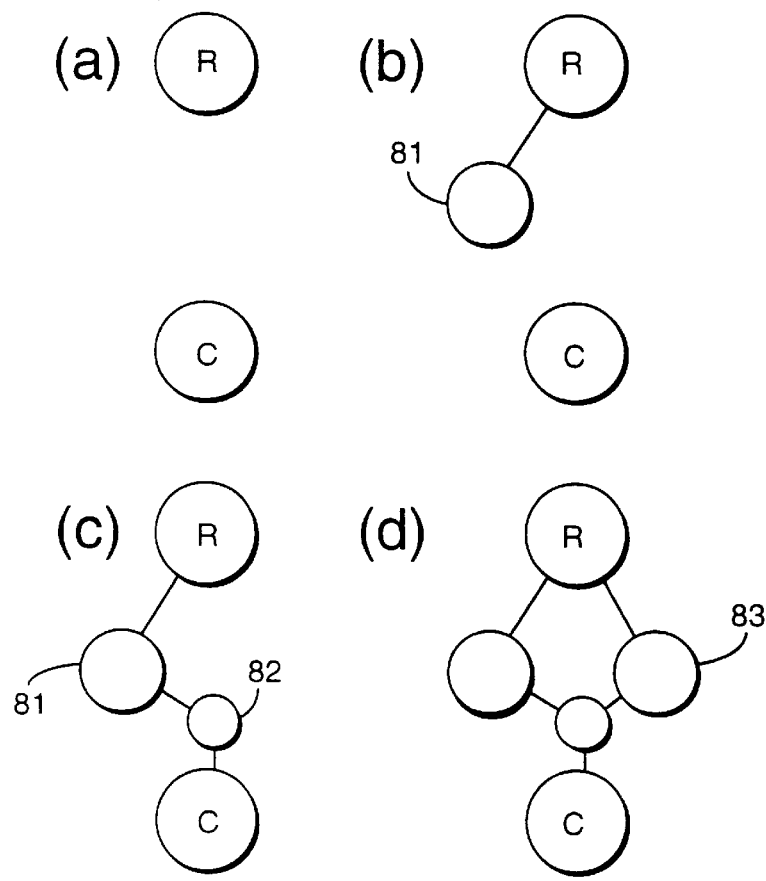
FIG. 8 shows the stages in the creation of a graph as a cellular network.

FIG. 8 shows the stages involved in the building of a simple graph. FIG. 8a shows the first stage in the graph building process; that of creation of root (R) and concentrator (C) nodes. FIG. 8(b) shows the creation of the first child 81 and in the next stage shown in FIG. 8(c) a child 82 of the child 81 is created. This is then connected to the concentrator C. In the final stage a further child 83 of the root node is created and connected to its child 82 which is an earlier created child of cell 81.

The next stage is to "validate" the schema graph which has been created. This is a test carried out to ensure that no messages get lost or enter infinite loops circling through the same cells in the graph. The graph should be a directed acyclic graph (DAG) and to check this any message sent from a cell to a child must not then return as an input to this cell from a parent.

A message called GRAPHCHECK is sent to the root cell and thence to each cell and its children in turn, in a synchronous manner. The GRAPHCHECK message contains a list of cell identifiers through which the message has passed. The arrival of the message at a cell invokes a check of the cell id of that cell against those in the list of cell ids that have already been visited. If there is a match then that cell has been visited before and there is a loop in the graph. In such circumstances the graph would be held invalid. The errors are noted by marking the cell status accordingly.

Children of each cell are sent the message and if it returns from every child cell with no error then the cell status is marked valid and this cell id is removed from the list on the message. The message is then sent back to the parent which sent it. If this cell is checked from another cell then it will immediately return the result that it is valid by checking its status.

The pseudo-code for the GRAPHCHECK message is as follows:

```
message GRAPHCHECK
{
    if status NOT set
    {
    if cellid in list of cellids in GRAPHCHECK
        {
        status = invalid
        copy status to GRAPHCHECK data
        /* could mark the cellid which caused error for reporting */
        return
        } status = valid
    add cellid to list in GRAPHCHECK
    for each child
        {
        send synchronous GRAPHCHECK
        if status returned in GRAPHCHECK = = invalid
            {
            status = invalid
            return
            }
        }
    remove cellid from GRAPHCHECK data
    set GRAPHCHECK return status to valid return
    }
    else
    {
    copy status to GRAPHCHECK data
    return
    }
}
```

With the generic schema graph having been created and verified, the next step is to tailor this generic graph to a customer specific graph. This step is the step represented by box 62 in FIG. 6. It is referred to as "lighting up" the graph or instantiating the graph. In essence this lighting up process involves mapping customer inventory information held in the CDM 11 to the schema graph held in the PDM 15 to create a graph which is specific to that customer.

Each customer will have a number of items which will generate events to be charged. The items are referred to as Feature Items (FI) and they will include telephone lines, charge cards and private circuits. The events generated by the Feature Items will be charged for according to billing options held in the customer inventory. The options are termed products. An example of a product is "Family and Friends" which was described earlier.

The customer inventory will include all instances of the products to which the customer subscribes. A product may have more than one instance, for example, the "Family and Friends" product will have two instances where the customer has two telephone lines utilising this product. Each product instance in the customer inventory contains all the customer defined attributes and data which relates to that instance of the product.

The process of "lighting-up" the graph entails instructing each cell of the graph where to locate the product instances and the instances of the schemas it is to use. In order to do this each cell has at least one instance table. An example of a table is given below.

| Instance No. | PSC | Instance Id. | Instance Selector |
| --- | --- | --- | --- |
| GMM defined | Code | Supplied by CDM | pointer to list of instances |

The tailored graph can then be applied to the customer events (box 63 FIG. 6) in order to calculate the invoice.

Figure 9:
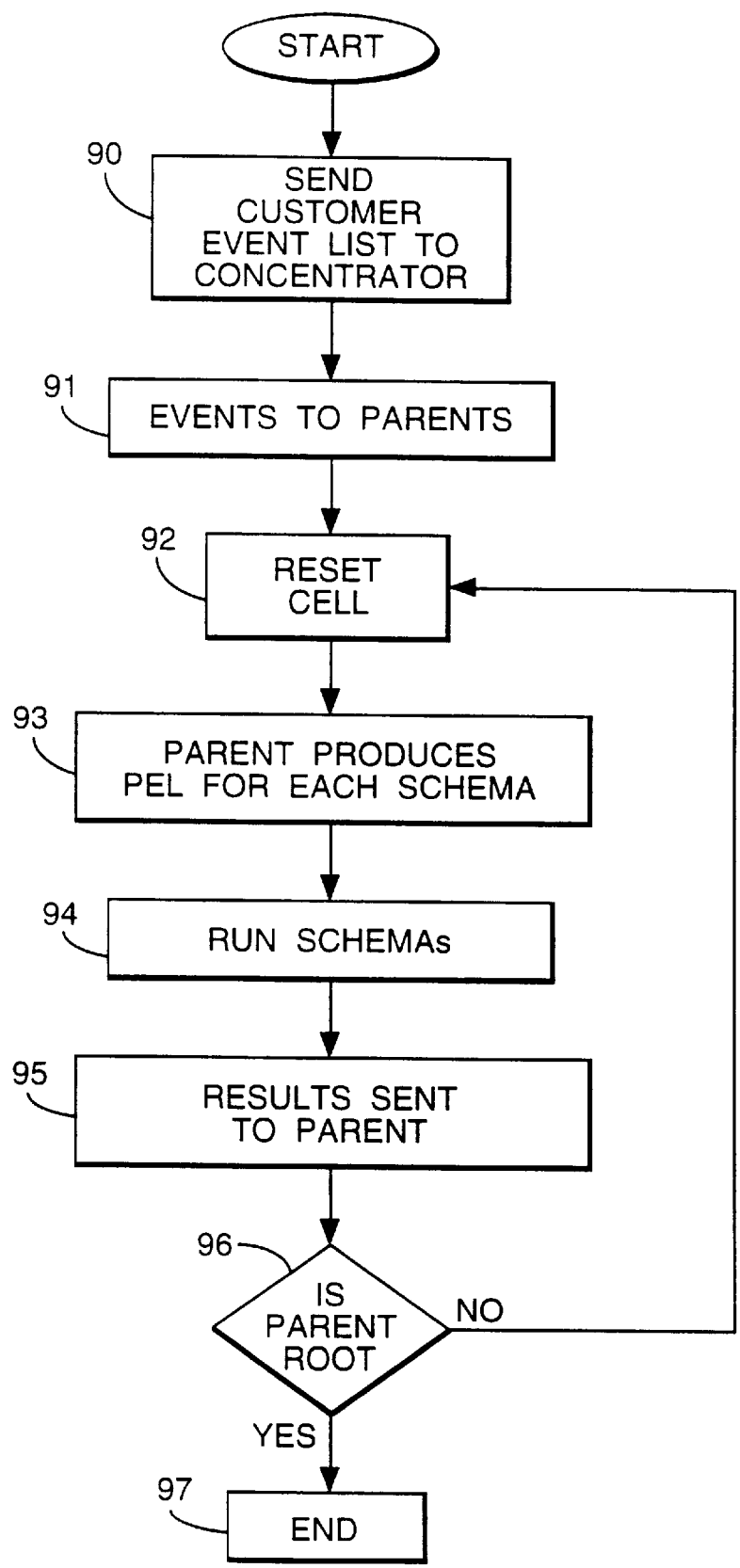
FIG. 9 is an explanatory flow-chart of the way in which a graph is applied to customer data (events)

The steps involved in this process are shown in FIG. 9. A first step in the process is to send the customer event list to the concentrator cell of the customer specific graph, this step being represented by box 90. The concentrator cell sends the appropriate events to its parent cells via the appropriate links, as represented by box 91. The concentrator cell then resets as represented by box 92. This involves the discarding of customer specific information. The cell is then no longer lit up and is ready to be "lighted up" to form a cell of a graph specific to the next customer.

Each parent upon receipt of the events produces a PEL for each schema instance it has, as represented by box 93. The schema instances are run, as represented by box 94 and the results are sent to the appropriate parents of that cell, as represented by box 95. If the parent is the root cell (box 96) then the data has traversed the graph and the process ends as represented by box 97. If the parent is not the root then the steps represented by boxes 92 to 96 are carried out again.

Figure 10:
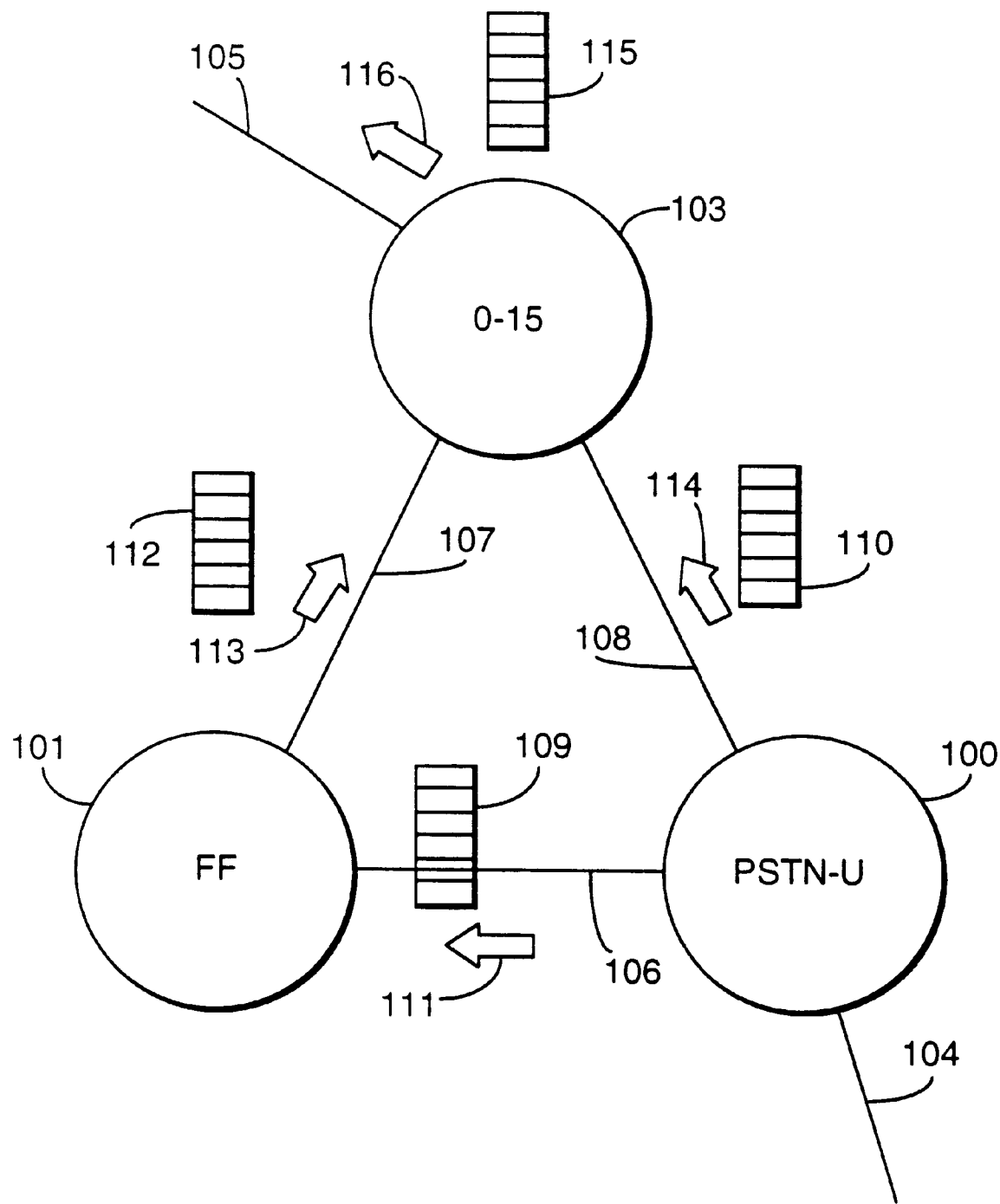
FIG. 10 is a schematic diagram of the way in which the schemas of the customer specific graph process, create and combine events, and how the events flow from cell to cell in the graph.

Thus, in applying the graph to the customer data a series of PELs are caused to "flow up" the graph (up in the sense from concentrator to root). FIG. 10 shows part of such a customer graph. The figure shows three cells 100, 101 and 103. Cell 100 is concerned with a product called "PSTN-U", cell 103 is concerned with a product called "OPTION 15" and cell 101 is concerned with a product called "Family and Friends". Data flows into this part of the graph by means of link 104 to cell 100 and leaves the graph by means of link 105 from cell 103. A link 106 exists between cell 100 and cell 101. Between cell 101 and cell 103 there is a link 107 and between cell 103 and 100 there is a link 108.

Consider the situation where the customer has two lines numbered 124 and 456. Because there are two numbers, there will be two instances of the PSTN-U schema one for each number and this cell will output two PELs 109 and 110. PEL 109 relates to line 456 and PEL 110 relates to line 123. The customer has taken Option 15 on line 123 and both "Family and Friends" and "Option 15" on line 456.

Thus, PEL 109 is directed in the direction of arrow 111 to cell 101 because line 456 has the option "Family and Friends". Cell 101 applies the schema to the input PEL 109 and outputs another PEL 112 in the direction of arrow 113 along link 107. PEL 112 thus concerns calls on link 456 to telephone numbers discounted according to the "Friends and Family" option.

Cell 103 awaits for the arrival of both PELs 112 and 110. PEL 110 is directed to cell 103 along link 108 in the direction of arrow 114. This cell processes the input PELs by discounting the total telephone usage on both lines. A PEL 115 is output from the cell 103 along link 105 in the direction of arrow 116 to the next cell in the graph (not shown). The output PEL 115 contains all the telephone usage records for both lines with the appropriate discounts applied.

An important point to be noted here is that each PEL has a data-field which indicates the PEL from which it originated. This allows billing errors to be traced to the erroneous schema. As the schema instances execute, a PEL "spreadsheet" will be built up. The "spreadsheet" will contain information about the execution of the customer specific graph. For the example illustrated in FIG. 10 the PEL "spreadsheet" would be as shown in FIG. 11.

Figure 11:
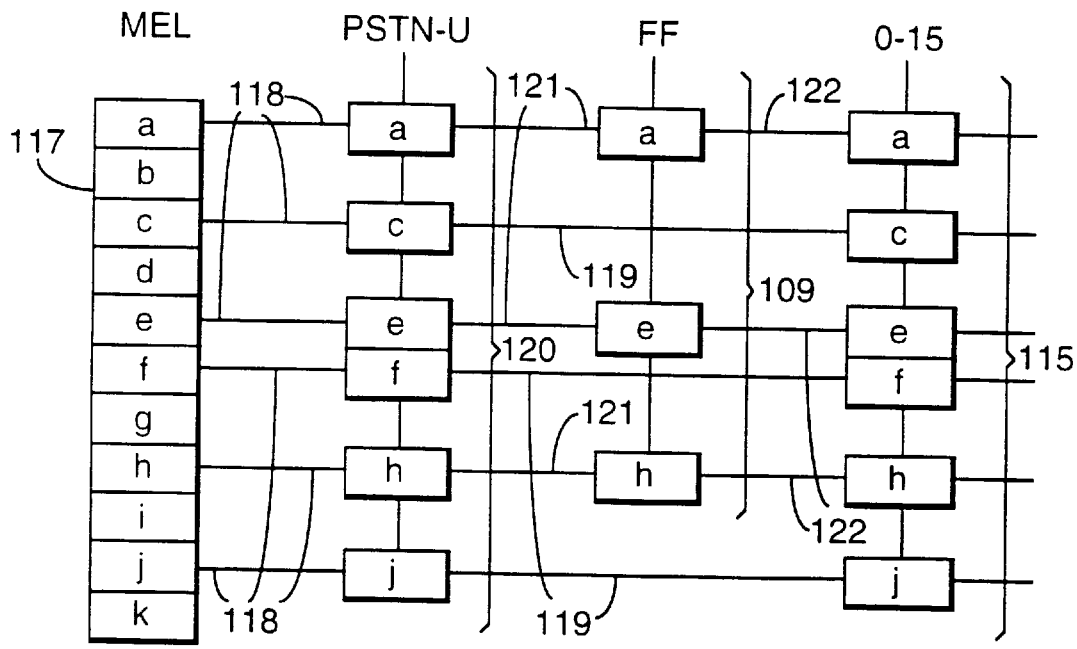
FIG. 11 is an explanatory diagram which shows the way in which the results of the schemas point to their origins.

A MEL 117 comprises a number of events labelled a to k in the FIG. 11. Of these events a, c, e, f, h, j are directed to cell 100 and traverse the section of graph depicted in FIG. 10. These events form the input PEL sent on link 104 to cell 100 but have pointers 118 back to their counterparts in the MEL 117. The input PEL is effectively split by the cell 100 in to the PEL 100 sent directly to the cell 103 containing events c, f, j and the PEL 111 sent to cell 101 containing events a, e and h. The events sent to cell 101 are processed to form PEL 112 and these have pointers 121 back to back to PEL 120. The events of PEL 109 are processed by cell 101 to form PEL 112 which is to cell 103. Output PEL 115 has events a, e, h, j with pointers 122 back to PEL 109.

After the events have been processed and leave the graph, they are passed to the IPE 4b of the CBP 4 where the bill is printed out and dispatched to the user, as represented by box 64 of FIG. 6.

The process is then repeated (steps 62 to 64) for the next customer, as represented by box 65.

The above described process does not take into account the "distinguishing date" information contained in an event. This becomes important because the customer specific data may show a change in circumstances during the billing period so that an event being processed needs to follow different links between cells (or schemas) at different times. As an example, the billing period may be January to February but the customer, although having the service "Option 15" continuously for his line 456, may only have begun to subscribe to Friends and Family for that line in February.

Figure 12:
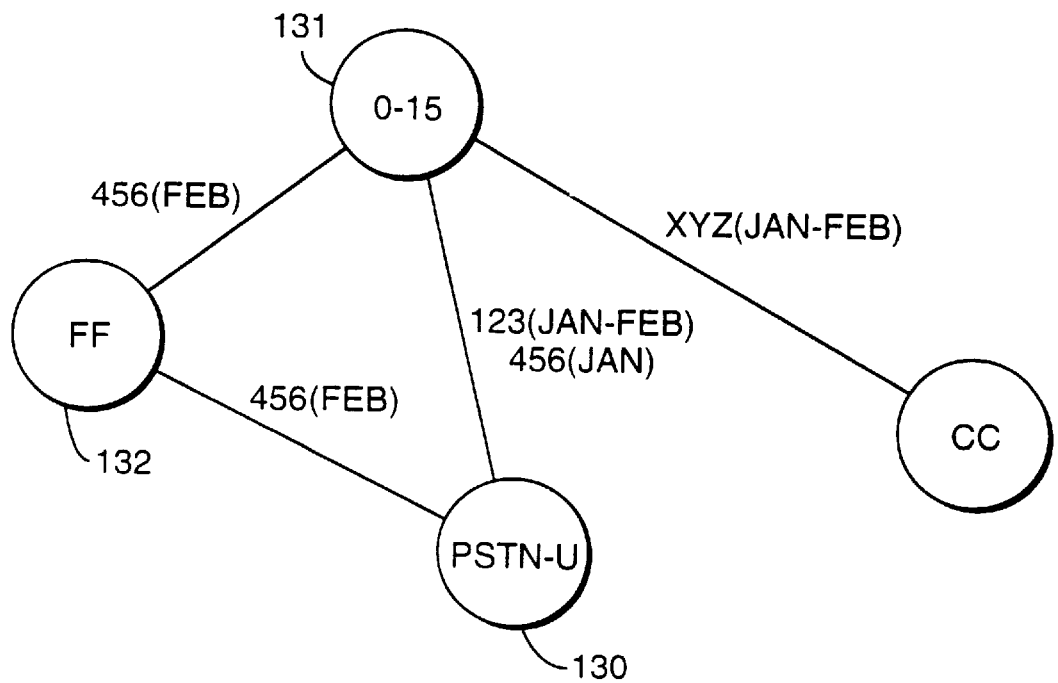
FIG. 12 is a schematic diagram of the way a date-dependent change in customer specific data can be built into a customer specific graph.

Referring to FIG. 12, looking at links from the concentrator node 130 to the "Option 15" node 131 and to the "Friends and Family" node 132, then these links will need associated date/time data to show the change in relationship, so that an event can be correctly "routed". This is because until February, a customer event should proceed from the concentrator node 130 directly to the "Option 15" node 131. After the beginning of February however, event data for line 456 should follow the link to the "Friends and Family" node 132 and only thence to the "Option 15" node 131.

It is possible to "tag" a link between two cells in this respect. Once two cells have been instantiated, it is possible to look at the instance tables of the two cells to find overlaps. These overlaps then indicate which ranges apply to apply to which links so that event data will flow along the correct link when the data is processed by the graph.

What is claimed is:

1. A method for processing data to produce a bill for usage of a communications network, said method comprising:

i) receiving event data from the communications network, the event data concerning a plurality of network usage events attributable to a user over a period of time;

ii) providing a set of schemas applicable to respective communications services available to users by means of the network, each schema comprising at least one rule, or an identifier for at least one rule, for use in processing received event data in respect of that service;

iii) providing user specific information which identifies a set of services selected from the available communications services for use by that user;

iv) selecting from the set of schemas, in accordance with the user specific information, a plurality of schemas applicable to the event data received, said selected schemas defining an ordered set of rules for processing the event data for that user; and v) applying the selected schemas to the event data to process the event data for bill production.

2. A method as in claim 1 wherein the method further comprises:

vi) storing a generic data processing structure, comprising an ordered set of data processing nodes which are structured for the processing of event data relating to communications services available over the network, each node having an associated schema from the set of schemas, wherein the step of selecting a set of schemas is carried out by selecting a subset of the ordered set of data processing nodes which have associated therewith respective schemas for processing network event data in respect of the selected set of services for the user.

3. A method as in claim 2 which further comprises:

vii) instantiating each of the subset of data processing nodes with user specific data in relation to the selected set of services, prior to applying the selected schemas to the event data.

4. A method as in claim 2 wherein an item of the event data comprises at least one distinguishing date and the step of selecting schemas for processing that item of event data includes the step of reading the distinguishing date and selecting a schema from alternative schemas in accordance with said date.

5. A method as in claim 3 wherein at least one of the subset of data processing nodes is instantiated with user specific data comprising data information in relation to a service, which date information is used in processing network event data in respect of at least one of said selected set of services.

6. A method as in claim 1 wherein the schemas to be applied to the data are formed as a linked node structure of inter-related schemas and the events to be processed are input to the structure.

7. A method as in claim 6 wherein:

the events are formed into a master event list, and the linked node structure is formed as a graph of schemas, each schema processing at least some of the events on the master event list, whereby at least some of the events of the master event list are input into a first node of the graph such that the events pass through nodes in the graph to a final node from which they are output from the graph in a processed form.

8. A method as in claim 7 wherein the graph is formed by activating at least some of the nodes in a generic graph.

9. A method as in claim 8, wherein the generic graph is built from a set of information about respective products and services available on or in connection with the communications network.

10. A method as in claim 9 wherein the set of information is held on a database which may be updated to cater for a change in the products and services available on or in connection with the communications network.

11. A method as in claim 7 wherein at least some of the processed events include pointers to nodes through which they passed.

12. A method as in claim 1 wherein each schema comprises one or more rules obtained from a database of rules.

13. A method as in claim 12 wherein at least one rule is used for more than one schema either alone or in combination with another rule.

14. A method as in claim 12 including the step of forming at least one schema from one or more of the rules.

15. A method for processing data to produce a bill for usage of a communications network, said method comprising:

i) receiving event data from the communications network, the event data concerning a plurality of network usage events attributable to a user over a period of time;

ii) providing a set of schemas applicable to respective communications services available to users by means of the network, each schema comprising at least one rule or an identifier for at least one rule, for use in processing received event data in respect of that service;

iii) storing a generic data processing structure, comprising an ordered set of data processing nodes which are structured for the processing of event data relating to communications services available over the network, each node having an associated schema from the set of schemas;

iv) providing user specific information which identifies one or more services selected from the available communications services for use by that user;

v) selecting from the set of schemas, in accordance with the user specific information, one or more schemas applicable to the event data received, said selection comprising selecting a subset of the ordered set of data processing nodes; and vi) applying the selected subset of the data processing nodes to the event data to process the event data for bill production.

16. A method as in claim 15 further comprising the step of:

instantiating each of the subset of data processing nodes with user specific data in relation to the selected set of services, prior to applying the selected schema or schemas to the event data.

17. A method as in claim 15 wherein an item of the event data comprises at least one distinguishing date and the step of selecting one or more schemas for processing that item of event data includes the step of reading the distinguishing date and selecting a schema from alternative schemas in accordance with said date.

18. A method as in claim 15 wherein at least one of the subset of data processing nodes is instantiated with user specific data comprising date information in relation to a service, which date information is used in processing network event data in respect of at least one of said selected set of services.

19. Apparatus for processing data to produce a bill for usage of a communications network, said apparatus comprising:

i) a data receiver for receiving event data from the communications network, the event data concerning a plurality of network usage events attributable to a user over a period of time;

ii) a first data store storing a set of schemas applicable to respective communications services available to users by means of the network, each schema containing at least one rule, or an identifier for at least one rule, for use in processing received event data in respect of that service;

iii) a second data store storing user specific information which identifies a set of services selected from the available communications services for use by that user;

iv) a schema selector for selecting from the set of schemas, in accordance with the user specific information, a plurality of schemas applicable to the selected services, said selected schemas defining an ordered set of rules for processing the event data for that user, and;

v) a processor for applying the selected schemas to the event data to process the event data for bill production.

* * * * *